US007946624B2

(12) United States Patent
Sakakibara et al.

(10) Patent No.: US 7,946,624 B2

(45) Date of Patent: May 24, 2011

(54) MOUNTING STRUCTURES FOR PIPING MEMBERS

(75) Inventors: Hitoshi Sakakibara, Handa (JP); Takayuki Usui, Aichi-ken (JP)

(73) Assignee: Aisan Kogyo Kabushiki Kaisha, Obu-shi, Aichi-ken (JP)

( * ) Notice: Subject to any disclaimer, the term of this patent is extended or adjusted under 35 U.S.C. 154(b) by 504 days.

(21) Appl. No.: 12/212,930

(22) Filed: Sep. 18, 2008

(65) Prior Publication Data

US 2009/0107872 A1 Apr. 30, 2009

(30) Foreign Application Priority Data

Oct. 24, 2007 (JP) ................................ 2007-276308

(51) Int. Cl.
*B60P 3/22* (2006.01)

(52) U.S. Cl. ........................................ 280/830

(58) Field of Classification Search .................. 280/830; 285/203, 204, 194, 208
See application file for complete search history.

(56) References Cited

U.S. PATENT DOCUMENTS 2,514,504 A * 7/1950 Moline ...................... 285/140.1
5,427,263 A * 6/1995 Bowles ........................ 220/86.2
5,725,258 A * 3/1998 Kujawski ...................... 285/308
5,964,485 A * 10/1999 Hame et al. .................... 285/320
5,984,378 A * 11/1999 Ostrander et al. ............ 285/319
6,443,496 B2 * 9/2002 Campau .......................... 285/81
6,843,510 B2 * 1/2005 Leymarie et al. ............. 285/308
7,390,979 B1 * 6/2008 Johnson ........................ 174/655
7,862,090 B1 * 1/2011 Foreman ........................ 285/347
2007/0163659 A1 * 7/2007 Uhara et al. ............. 137/565.17
2008/0129047 A1 * 6/2008 Blivet et al. .................... 285/308

FOREIGN PATENT DOCUMENTS

DE 10114227 10/2001
DE 10227604 1/2003
JP 10103179 4/1998

* cited by examiner

*Primary Examiner* — Kevin Hurley
*Assistant Examiner* — Tashiana Adams
(74) *Attorney, Agent, or Firm* — Dennison, Schultz & MacDonald

(57) ABSTRACT

The present invention includes a mounting structure having a flange and a plurality of hook portions formed integrally with a piping member. The flange can contact a first surface of an element having a through-hole formed therein. The hook portions extend from the flange for inserting into the through-hole and can resiliently deform in a radial direction with respect to the axis of the flange. Each hook portion has a hooking end that can engage a second surface of the element opposite to the first surface.

13 Claims, 8 Drawing Sheets

MOUNTING STRUCTURES FOR PIPING MEMBERS

This application claims priority to Japanese patent application serial number 2007-276308, the contents of which are incorporated herein by reference.

BACKGROUND OF THE INVENTION

1. Field of the Invention

The present invention relates to mounting structures, and in particular to mounting structures for mounting piping members, such as piping joints, to an element having a through-hole such that the piping members can rotate about an axis of the through-hole.

2. Description of the Related Art

A known device for mounting a piping joint is disclosed, for example, in Japanese Laid-Open Patent Publication No. 10-103179. The mounting structure of this publication is shown in FIG. 9 and is configured to mount a piping joint 100 to a closure member 110 of a fuel tank such that the piping joint 100 can rotate relative to the closure member 110. The closure member 110 has a through-hole 112, into which a vertical pipe 101 of the piping joint 100 can be inserted. A clip-retaining portion 114 is formed on the closure member 110 to surround the through-hole 112. A flange 102 is formed on the upper end of the vertical pipe 101. The clip-retaining portion 114 can receive the flange 102 therein when the vertical pipe 101 is inserted into the through-hole 112.

A clip-insertion window 114*s* is formed in the clip-retaining portion 114 and is open in a horizontal position at a level higher than the flange 102 when the flange 102 is received within the clip-retaining portion 114. A plate-like U-shaped clip 117 can be inserted into the clip-insertion window 114*s* in order to hold the flange 102 from its upper side.

Thus, after the vertical pipe 101 of the piping joint 100 has been inserted into the through-hole 112, the U-shaped clip 117 can hold the flange 102 from its upper side. Therefore, it is possible to prevent the vertical pipe 101 from being removed from the through-hole 112 and to ensure that the piping joint 100 can rotate relative to the closure member 110.

However, with the mounting structure of the above publication, the U-shaped clip 117 is required separately for mounting the piping joint 100 to the closure member 110. In addition, the mounting operation is troublesome because of the use of the U-shaped clip 117.

Therefore, there is a need in the art for mounting structures for piping members, which require a minimum number of parts.

SUMMARY OF THE INVENTION

One aspect according to the present invention includes a mounting structure having a flange and a plurality of hook portions formed integrally with a piping member, such as a piping joint. The flange can contact one of opposite surfaces of an element, such as a plate-like portion of a sender gauge, having a through-hole formed therein. The hook portions extend from the flange for inserting into the through-hole and can resiliently deform in a radial direction with respect to the axis of the flange. Each hook portion has a hooking end that can engage the other of the opposite surfaces of the element.

DETAILED DESCRIPTION OF THE INVENTION

Figure 1:
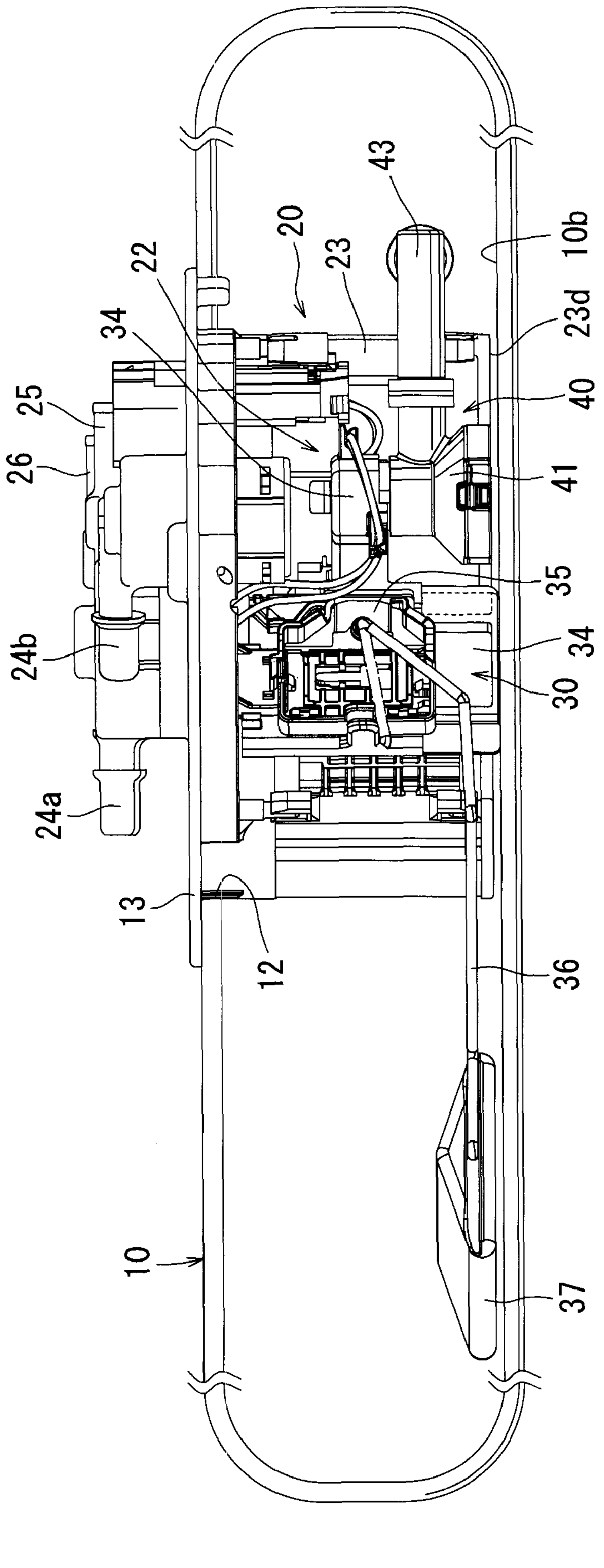
FIG. 1 is a side view showing the internal structure of a fuel tank incorporating a mounting structure for a piping joint according to an embodiment of the present invention.

Each of the additional features and teachings disclosed above and below may be utilized separately or in conjunction with other features and teachings to provide improved mounting structures and apparatus incorporating the mounting structures. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

In one embodiment, a mounting structure mounts a piping joint to an element with a through-hole formed therein such that the piping joint can rotate about an axis of the through-hole. The piping joint has a connection portion for connecting to a pipe or a tube. The mounting structure includes a flange provided on the piping joint. The flange includes a ring-shaped contact surface configured to be able to contact with a first surface of the element about a first end opening of the through-hole. A plurality of hook portions extend in an axial direction from the flange for inserting into the through-hole. The hook portions can resiliently deform radially inward with respect to the axis of the through-hole when hooking ends of the hook portions pass through the through-hole. The hook portions can return radially outward and the hooking ends can engage a second surface opposite to the first surface of the object about a second end opening opposite to the first end opening of the through-hole after the hooking ends have passed through the through-hole.

With this arrangement, by inserting the hook portions into the through-hole of the element, the element can be clamped between the hooking ends of the hook portions and the flange at a position about the through-hole. Hence, no additional element is required for the mounting operation. As a result, the number of parts can be reduced and the operation for mounting the piping joint to the element can be easily effectively performed.

The piping joint may include a tubular shaft extending from the flange at a position radially inward of the contact surface. The tubular shaft is configured to be able to be fitted into the through-hole. Base ends opposite to the hooking ends of the hook portions may be connected to an end portion of the tubular shaft. A seal member may be fitted on an outer circumferential surface of the tubular shaft for sealing between the tubular shaft and an inner circumferential wall of the through-hole. With this arrangement, it is possible to ensure a seal between the tubular shaft and the inner circumferential wall of the through-hole.

A stopper may be formed on the second surface of the element, so that any one of the hooking ends of the hook portions can contact the stopper so as to be prevented from further rotation when the piping joint has rotated to a predetermined position about the axis of the through-hole. With this arrangement, it is possible to easily position the piping joint relative to the element with respect to the rotational direction.

In another embodiment, a mounting structure mounts a suction pipe to an element disposed within a fuel tank of a vehicle and having a plate-like portion with a through-hole. The suction pipe is disposed within the fuel tank for providing a part of a flow path of a fuel from within the fuel tank to a vehicle engine.

In a further embodiment, an apparatus is provided that includes a fuel tank for storing a fuel therein, a sender gauge disposed within the fuel tank for detecting a level of the fuel within the fuel tank, a suction pipe disposed within the fuel tank for providing a part of a flow path of the fuel from within the fuel tank to a vehicle engine, and a coupling device for coupling the fuel suction pipe to a plate-like portion of the sender gauge.

A mounting device according to an embodiment of the present invention will now be described with reference to FIGS. 1 to 8. This embodiment relates to a mounting structure for mounting a suction pipe to a sender gauge adaptor. The suction pipe is adapted to introduce fuel that is drawn from a fuel tank of a vehicle, such as an automobile.

<General Construction of Fuel Tank>

Figure 2:
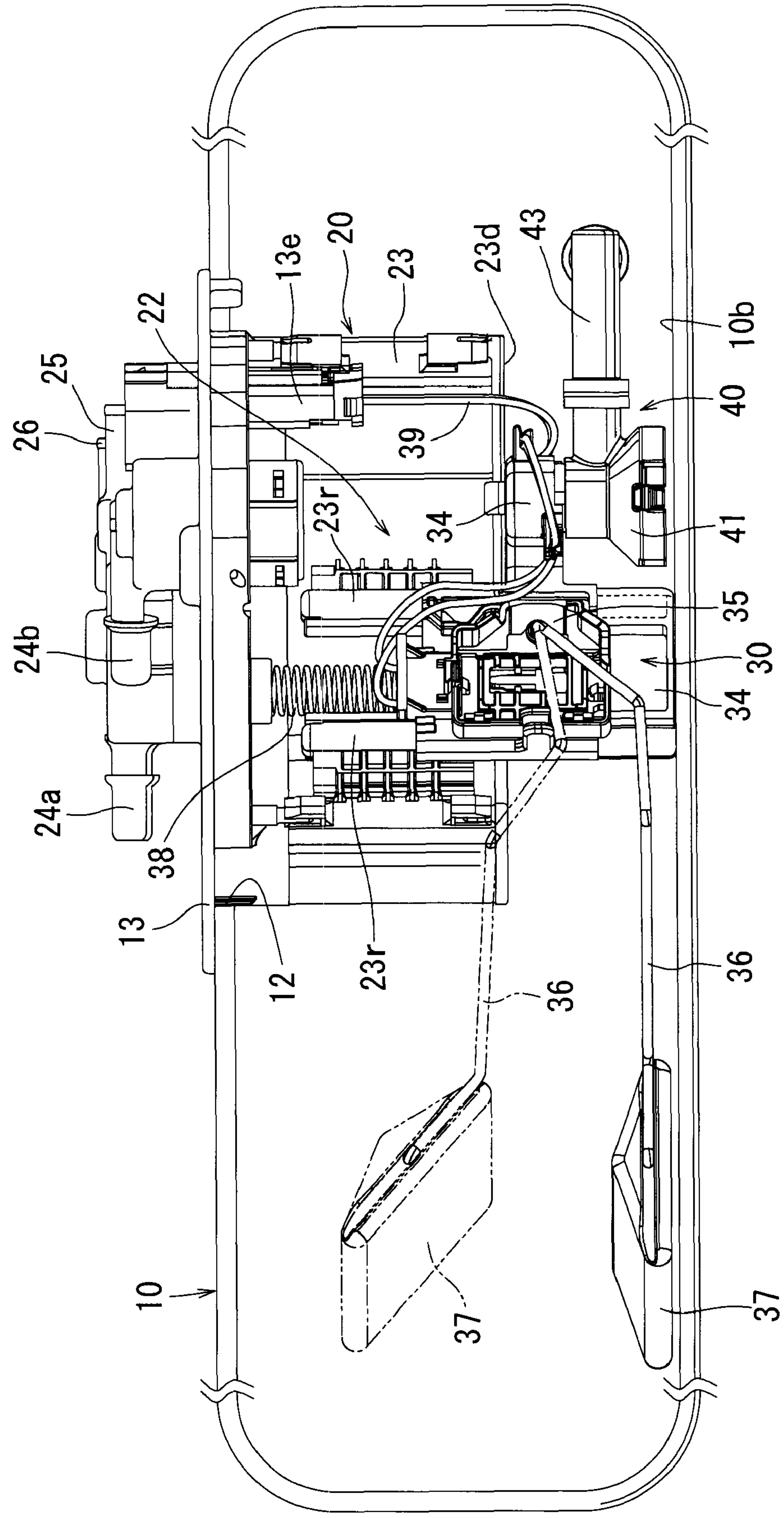
FIG. 2 is a side view similar to FIG. 1 but showing the fuel tank in a constricted state.

Referring to FIGS. 1 and 2, a fuel tank 10 is configured as a substantially sealed container for storing fuel. In this embodiment, the fuel tank 10 is made of resin and is molded to have a predetermined configuration. Because the fuel tank 10 is made of resin, in response to change of the external temperature, the fuel tank 10 may expand or constrict to cause change in the volume of the inner space. FIGS. 1 and 2 exaggeratingly show the fuel tank 10 in a constricted state and an expanded state, respectively.

An upper opening 12 is formed in the upper wall of the fuel tank 10. A canister module 20 that will be explained later can be inserted into the fuel tank 10 through the upper opening 12 so as to be received within the fuel tank 10. After the canister module 20 has been received within the fuel tank 10, a disk-like set plate 13 can close the upper opening 12.

<General Construction of Canister Module>

The canister module 20 generally includes the set plate 13, a canister 22 for removably adsorbing fuel vapor produced within the fuel tank 10, a sender gauge 30 for detecting the amount of the fuel remaining within the fuel tank 10, and a suction pipe 40 through which the fuel within the fuel tank 10 can be drawn.

The canister 22 has a canister case 23 having an upper opening. The internal space of the canister case 23 is divided into a plurality of chambers each containing activated carbon as an adsorption material. The upper opening of the canister case 23 is closed by the set plate 13 that is fixedly attached to the canister case 23 after the activate carbon has been filled within each chamber. A first tank port 24*a*, a second tank port 24*b*, a purge port 25 and an atmospheric port 26 are formed with the front surface (upper surface) of the set plate 13 for communicating with their related chambers of the canister case 23.

The first tank port 24*a* is in fluid communication with the upper space within inside of the fuel tank 10 via a fuel vapor pipeline (not shown). The second tank port 24*b* is in fluid communication with the upper space within inside of a sub tank (not shown) via a fuel vapor pipeline (not shown). The purge port 25 is in fluid communication with an intake air channel of a vehicle engine (not shown) via a purge pipeline (not shown). The atmospheric port 26 is open into the atmosphere.

Figure 3:
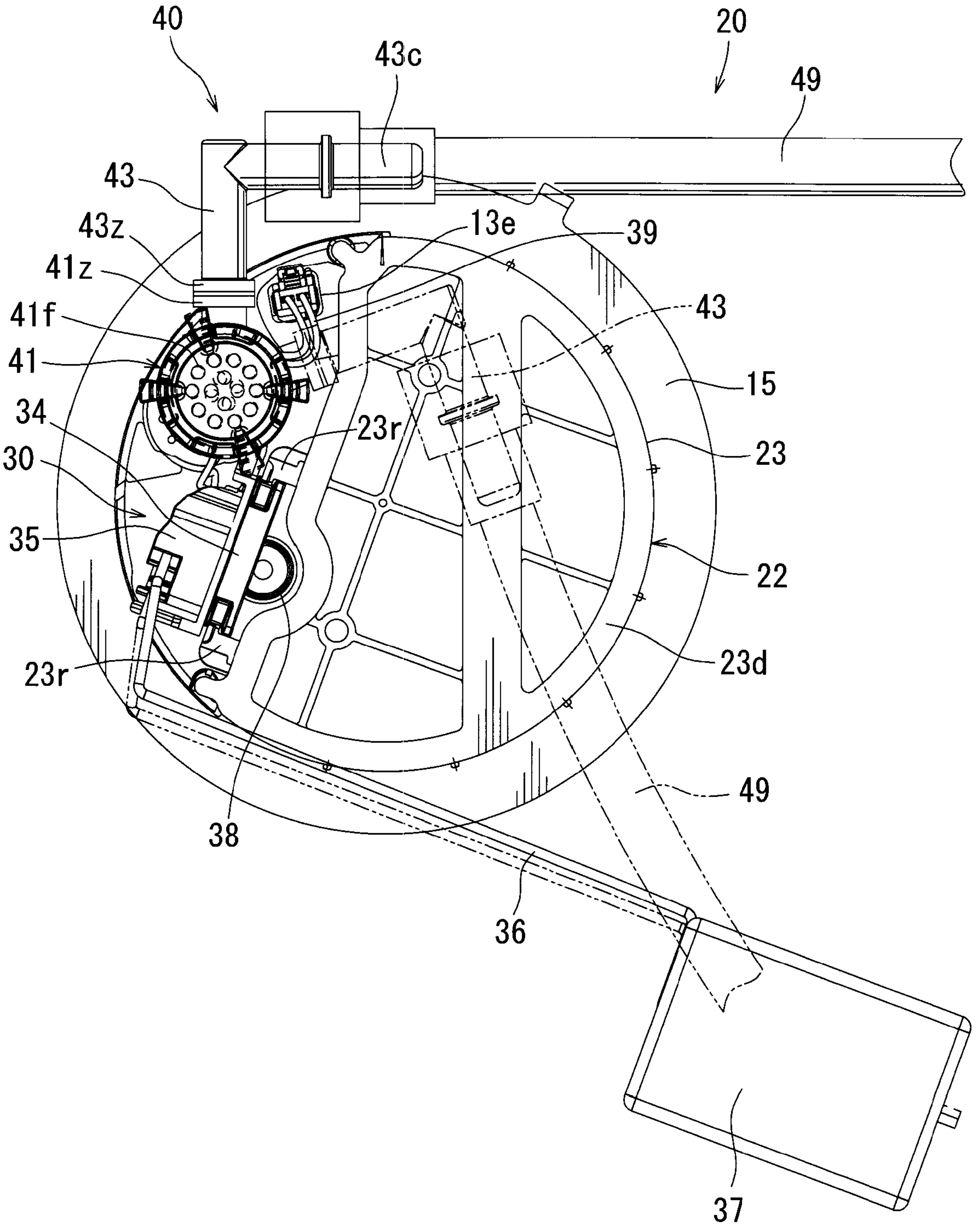
FIG. 3 is a bottom view of a canister module.

As shown in FIGS. 2 and 3, the sender gauge 30 includes a sender gauge adaptor 34, a gauge body 35, a gauge arm 36 and a float 37. The sender gauge adaptor 34 is vertically slidably supported on the lateral surface of the canister case 23. The gauge body 35 is mounted to the sender gauge adaptor 34. One end of the gauge arm 36 is vertically pivotally supported on the gauge body 35. The float 37 is mounted to the other end of the gauge arm 36 and can float on the surface of the fuel within the fuel tank 10.

The sender gauge adaptor 34 supports the gauge body 35 and the gauge arm 36 and vertically slidably engages a pair of stationary rails 23r that are formed on the lateral surface of the canister case 23. The stationary rails 23r extend in the vertical direction as shown in FIGS. 1 and 2. A compression coil spring 38 is interleaved between the lower side of the set plate 13 and the sender gauge adaptor 34, so that the sender gauge adaptor 34 is biased vertically downwardly. With this arrangement, the sender gauge adaptor 34 is held to contact with a bottom surface 10*b* of the fuel tank 10 even if the fuel tank has been expanded or constricted due to change of temperature. Therefore, the vertical level of the gauge body 35 with respect to the bottom surface 10*b* of the fuel tank 10 may not be changed.

The gauge body 35 includes an electric device (not shown) that can convert the change of inclination angle of the gauge arm 36 to change of electric resistance and can output an electric signal corresponding to the change of the electric resistance to an ECU (engine control unit). More specifically, the electric signal outputted from the gauge body 35 is transmitted to the ECU via an electric wire 39 and an electrical connector 13*e* that is mounted to the set plate 13 (see FIG. 3).

<Suction Pipe>

As shown in FIG. 2, the suction pipe 40 has a suction base 41 and a pipe body 43. The suction base 41 has a lower opening oriented toward the bottom surface 10*b* of the fuel tank 10. The pipe body 43 is connected to the lateral side of the suction base 41 and has an L-shaped configuration in plan view (see FIG. 3).

Figure 5:
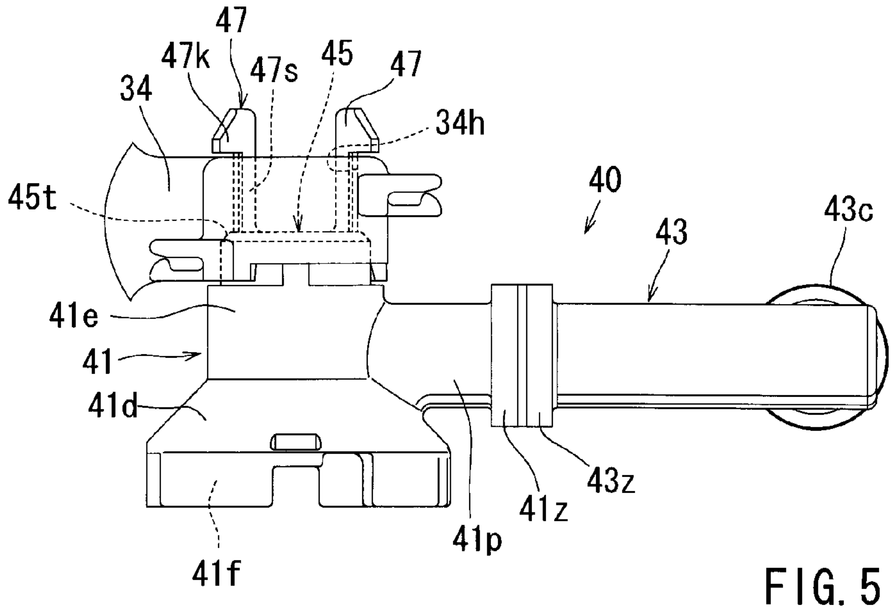
FIG. 5 is a side view of the mounting structure.

As shown in FIG. 5, the suction base 41 of the suction pipe 40 has a cylindrical tubular portion 41*e* and a conical tubular portion 41*d* extending downward from the cylindrical tubular portion 41*e*. The conical tubular portion 41*d* has a diameter gradually increasing in the downward direction. A suction filter 41*f* (see FIG. 3) is attached to the inside of the lower end portion of the conical tubular portion 41*d* and serves to filtrate the fuel. As shown in FIG. 5, a short pipe 41*p* is connected to a boundary region between the cylindrical tubular portion 41*e* and the conical tubular portion 41*d*. The short pipe 41*p* has a joint flange 41*z* to which a joint flange 43*z* provided at one end of the pipe body 43 is connected.

Figure 6A:
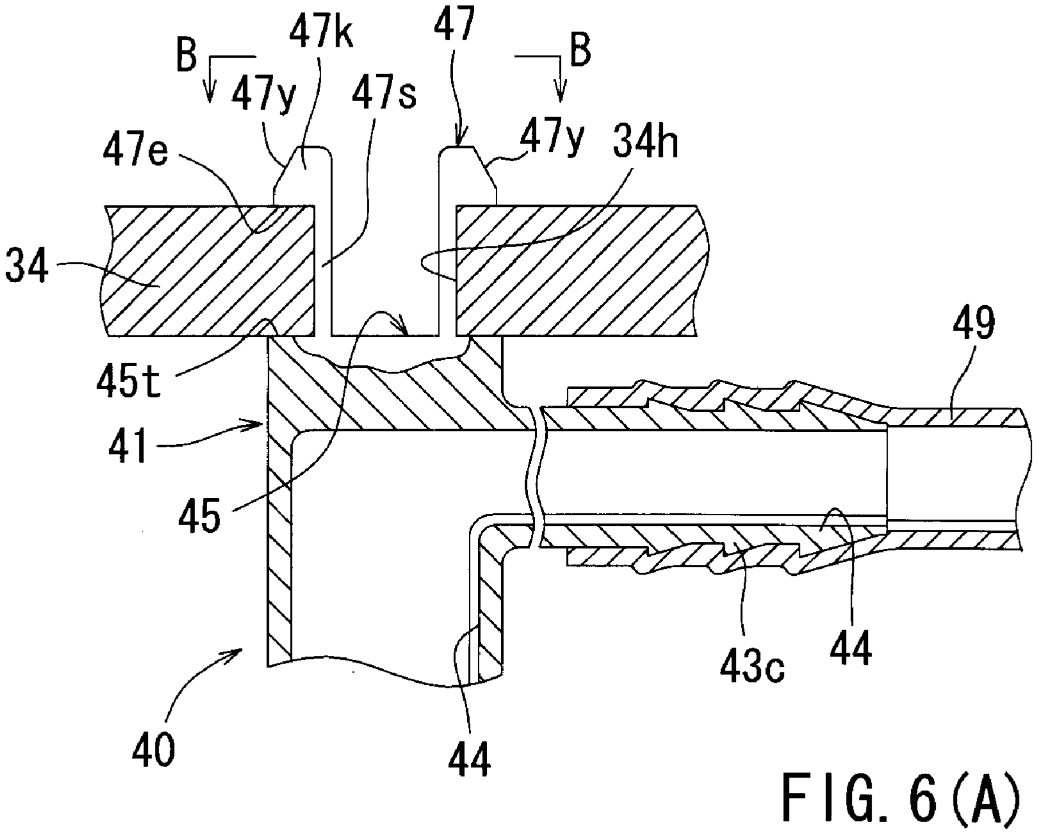
FIG. 6(A) is a vertical sectional view of the mounting structure.

As shown in FIG. 3, the pipe body 43 has a piping joint 43*c* disposed at the other end opposite to the joint flange 43*z*. One end of a flexible suction tube 49 that can resiliently deformable is connected to the piping joint 43*c*. The other end of the suction tube 49 is connected to a jet pump of a pump module (not shown) disposed within the sub tank. Therefore, the fuel within the fuel tank 10 may be supplied to the jet pump of the pump module via the suction base 41 and the pipe body 43 (more specifically a fuel channel 44 defined within the pipe body 43 as shown in FIG. 6(A)) of the suction pipe 40 and the suction tube 49. For the purpose of illustration, the joint flange 41*z* of the short pipe 41*p* and the joint flange 43*z* of the pipe body 43 are not shown in FIG. 6.

<Mounting Structure for Suction Pipe>

Figure 6B:
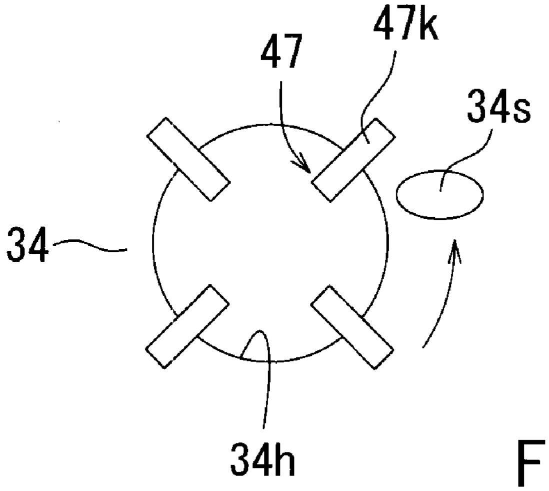
FIG. 6(B) is a schematic plan view showing the relation between hook portions and a stopper.

As shown in FIGS. 5, 6(A) and 6(B), the suction pipe 40 is mounted to the sender gauge adaptor 34 by means of a plurality of hook portions 47. The hook portions 47 are formed on the upper end of the suction base 41 and are inserted into a through-hole 34*h* formed in the sender gauge adaptor 34. In this embodiment, four hook portions 47 are provided.

More specifically, as shown in FIG. 6(A), a flange 45 is formed on the upper end of the suction base 41 and is positioned to be coaxial with the through-hole 34*h* of the sender gauge adaptor 34. A ring-shaped contact surface 45*t* is defined on the upper side of the flange 45 so as to contact the lower surface of the sender gauge adaptor 34 about the lower opening of the through-hole 34*h*. The hook portions 47 protrude upward from the flange 45 at positions radially inner side of the contact surface 45*t* and are inserted into the through-hole 34*h* so as to extend along the inner circumferential surface of the through-hole 34*h*. The hook portions 47 are spaced equally from each other in the circumferential direction. Each of the hook portions 47 has a flat plate-like part 47*s* having a strip-like configuration and extending upward from the flange 45 along an axial direction. A hooking end 47*k* is formed on the upper end of the flat plate-like part 47*s* and extends radially outward therefrom.

As shown in FIG. 6(A), the hooking end 47*k* has a configuration like a rectangular triangle as viewed from the lateral side and has a lower edge 47*e* that can engage the upper surface of the sender gauge adaptor 34 about the upper opening of the through-hole 34*h*. The hooking end 47*k* has a radially outer face 47*y*. The radially outer face 47*y* is inclined relative to the axis of the flange 45 (i.e., the axis of the through-hole 34*h*, so that the radially outer face 47*y* can contact the lower edge of the through hole 34*h* when the hook portion 47 is inserted into the through hole 34*h*. The distance between the lower edge 47*e* and the contact surface 45*t* of the flange 45 is set to be substantially equal to the length of the through-hole 34*h*, i.e., the thickness of the sender gauge adaptor 34.

The flat plate-like parts 47*s* are made of resin, so that the flat plate-like parts 37*s* can resiliently deform. In this embodiment, the suction base 41, the pipe body 43 and the hook portions 47 including the flat plate-like parts 47*s* and the hooking ends 47*k* are made of resin and formed integrally with each other. Therefore, as the hook portions 47 are inserted into the through hole 34*h*, the inclined radially outer faces 47*y* of the hooking ends 47*k* contact the lower open edge of the through hole 34*h* and slide along the lower open edge. Then, the hooking ends 47*k* move radially inward to cause the flat plate-like parts 47*s* to resiliently deform radially inward, so that the hooking ends 47*k* can pass through the through-hole 34*h*.

Once the hooking ends 47*k* have passed through the through-hole 34*h*, the flat plate-like parts 47*s* resiliently restore to cause the hooking ends 47*k* to move radially outward, so that the hooking ends 47*k* engage the upper open edge of the through-hole 34*h*. At the same time, the contact surface 45*t* of the flange 45 of the suction base 41 is brought to contact the lower surface of the sender gauge adaptor 34 about the lower opening of the through-hole 34*h*. As a result, the suction pipe 40 can be mounted or coupled to the sender gauge adaptor 34 such that the suction pipe 40 can rotate about the axis of the through-hole 34*h*.

As shown in FIG. 6(B), a stopper 34*s* is formed on the upper surface of the sender gauge adaptor 34 at a position proximal to the upper opening of the through-hole 34*h*. The stopper 34*s* is positioned such that any one of the hooking ends 47*k* of the hook portions 47 can contact the stopper 34*s* when the suction pipe 40 has rotated about the axis of the through-hole 34*h*. In other words, the stopper 34*s* limits the rotation of the suction pipe 40 within a predetermined angular range. When one of the hooking ends 47*k* positioned clockwise with respect to the stopper 34*s* as viewed in FIG. 6(B) has contacted the stopper 34*s* as a result of the rotation of the suction pipe 40 in the counterclockwise direction as indicated by an arrow in FIG. 6(A) (counterclockwise direction as viewed in FIG. 3), the suction pipe 40 may be positioned as indicated by solid lines in FIG. 3, where the pipe body 43 of the suction pipe 40 and the suction tube 49 joined thereto are positioned on the side opposite to the gauge arm 36 and the float 37 of the sender gauge 30 with respect to the canister case 23. From this solid line position, the suction pipe 40 can free to rotate in a clockwise direction to a position indicated by chain lines in FIG. 3.

In this way, the suction pipe 40 may correspond to a piping joint, and the sender gauge adaptor 34 may correspond to an element to which the pipe joint is mounted or coupled. The suction tube 49 corresponds to a tube that is connected to the piping joint.

<Process of Inserting Canister Module into Fuel Tank>

Prior to inserting the canister module 20 into the fuel tank 10, the suction pipe 40 is rotatably mounted to the sender gauge adaptor 34 by means of the hook portions 47, and the suction tube 49 is connected to the pipe body 43 of the suction pipe 40.

Figure 4:
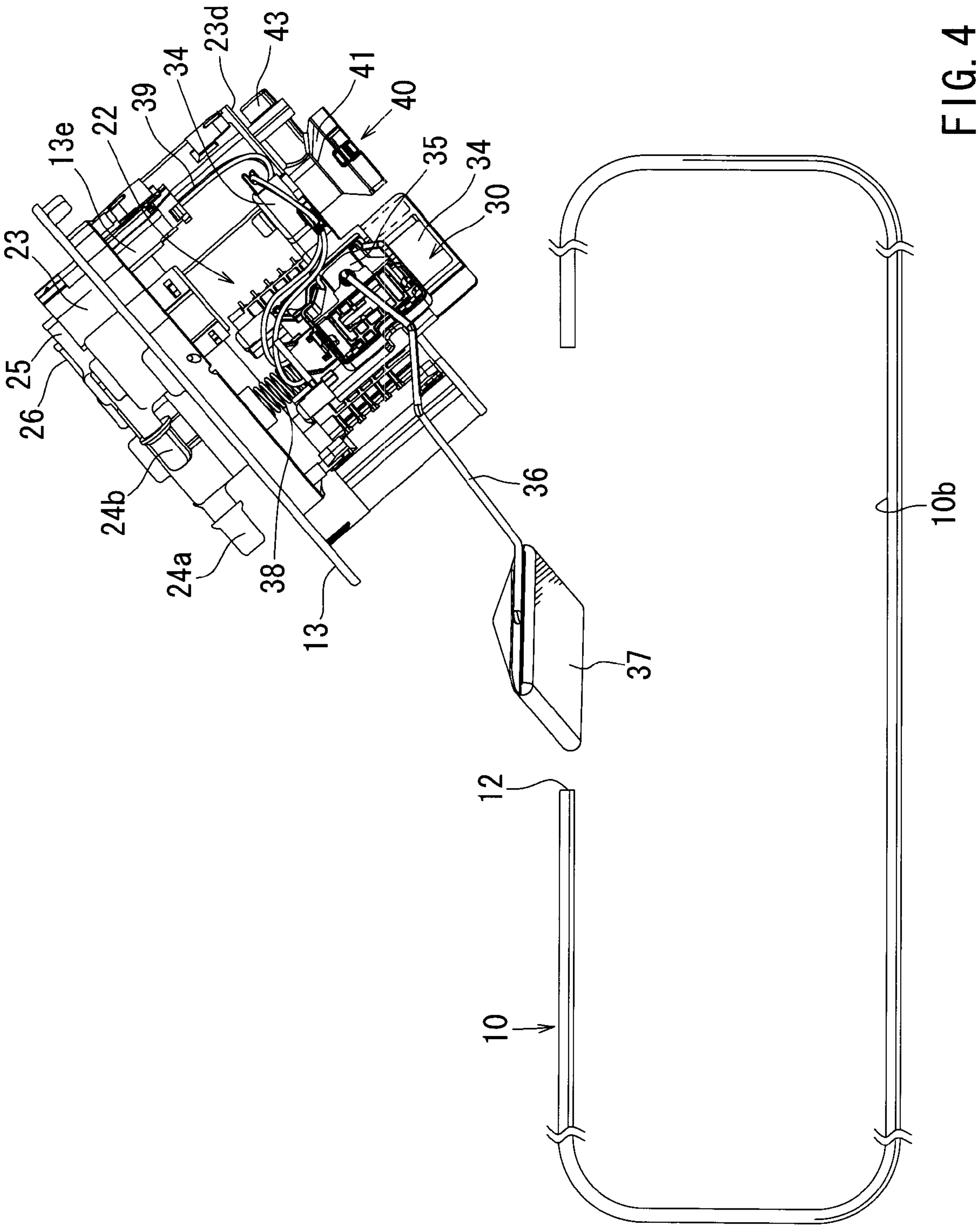
FIG. 4 is a side view showing a process of inserting the canister module into the fuel tank.

For inserting the canister module 20 into the fuel tank 10, the suction pipe 40 and the suction tube 49 are rotated relative to the sender gauge adaptor 34 in the clockwise direction until a position indicated by chain lines in FIG. 3 is reached. Hence, the suction tube 4 can be positioned on the same side as the gauge arm 36 and the float 37. Then, with the canister module 20 oriented obliquely with respect to the vertical direction as shown in FIG. 4, the suction tube 49, the gauge arm 36 and the float 37 are inserted into the fuel tank 10 through the upper opening 12.

Because the suction pipe 40 can rotate relative to the sender gauge adaptor 34, it is possible to orient the suction tube 49 in a desired direction. This may increase the degree of freedom in mounting the canister module 20 into the fuel tank 10.

Following the insertion of the suction tube 49, the gauge arm 36 and the float 37, the canister module 20 is inserted into the fuel tank 10 through the upper opening 12. After the canister module 20 has been set within the fuel tank 10, the suction pipe 40 may rotate relative to the sender gauge adaptor 34 to the solid line position shown in FIG. 3, where one of the hooking ends 47*k* contacts the stopper 34*s*. This rotation of the suction pipe 40 may be achieved by utilizing the resilient deformation of the suction tube 49. For example, prior to insertion into the fuel tank 10, the suction tube 49 may be connected to the jet pump of the pump module disposed within the fuel tank 10. Therefore, the suction tube 49 may resiliently return to be directed toward the jet pump after insertion into the fuel tank 10. Alternatively, a biasing member, such as a spring, may be provided between the suction pipe 40 and the sender gauge adaptor 34 in order to bias the suction pipe 40 toward the position indicated by solid lines in FIG. 3.

When in the solid line position shown in FIG. 3, the suction pipe 40 and the suction tube 49 are positioned on the radially outer side of the canister case 23. Therefore, even if a bottom pate 23*d* of the canister case 23 has become close to the bottom surface 10*b* of the fuel tank 10 as shown in FIG. 1 due to constriction of the fuel tank 10, the suction pipe 40 and the suction tube 49 do not interfere with the canister case 23.

At the same time the canister module 20 is set within the fuel tank 10, the set plate 13 that is integrated with the canister module 20 can close the upper opening 12 of the fuel tank 10.

<Advantages of the Mounting Structure>

According to the above embodiment, the hook portions 47 extending in the axial direction from the flange 45 of the suction pipe 40 can resiliently deform radially inward to constrict in the diametrical direction as the hooking ends 47*k* of the hook portions 47 pass through the through-hole 34*h* of the sender gauge adaptor 34. Once the hooking ends 47*k* have passed through the through-holes 34*h*, the hook portions 47 resiliently enlarge radially outward, so that the hooking ends 47*k* engage the upper opening edge of the through-hole 34*h*. Hence, a part of the sender gauge adaptor 34 about the through-hole 34*h* is clamped between the hooking ends 47*k* and the flange 45. In this way, the suction pipe 40 can be mounted or coupled to the sender gauge adaptor 34 in such a manner that the suction pipe 40 can rotate about the axis of the through-hole 34*h*.

Therefore, no additional separate member is required other than the suction pipe 40 and the sender gauge adaptor 34 having the through-hole 34*h*. In addition, the operation for mounting the suction pipe 40 to the sender gauge adaptor 34 can be easily rapidly performed.

Further, it is possible to easily reliably set the position of the suction pipe 40 relative to the sender gauge adaptor 34 by using the stopper 34*s*. Thus, it is possible to set the suction pipe 40 to a predetermined angular position through contact of one of the hooking ends 47*k* with the stopper 34*s*.

<Other Possible Arrangements>

The present invention may not be limited to the above embodiment but may be modified in various ways. For example, although only the hook portions 47 of the suction pipe 40 are inserted into the through-hole 34*h* of the sender gauge adaptor 34 in the above embodiment, it is possible to configure such that at least a part of the pipe body 43 is also inserted into the through-hole 34*h* as in the arrangement shown in FIG. 7.

Figure 7:
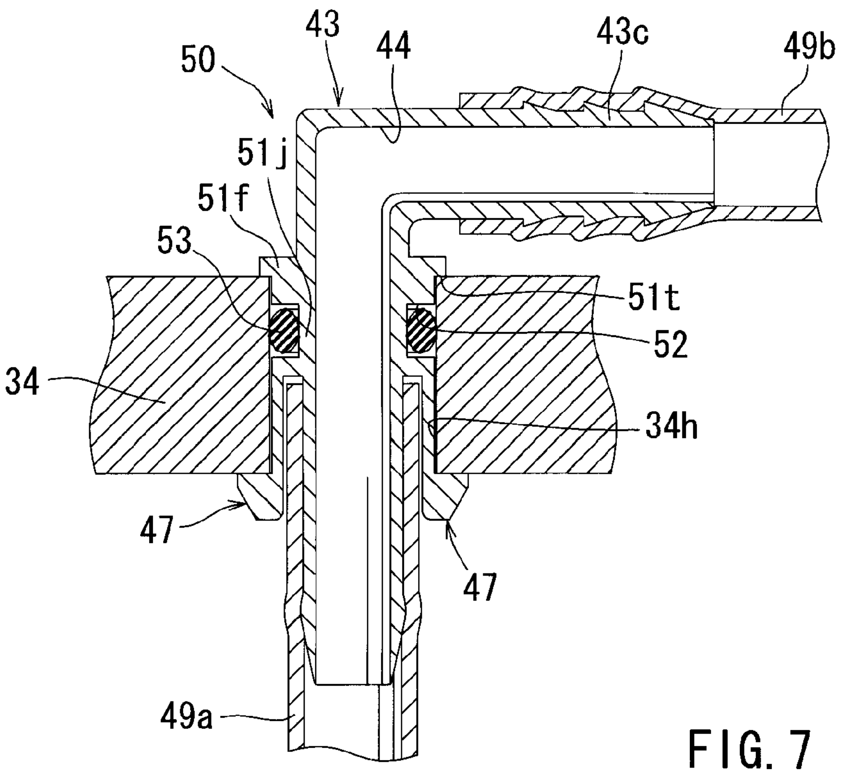
FIG. 7 is a vertical sectional view of a mounting structure for a piping joint according to another embodiment.

In the arrangement shown in FIG. 7, the pipe body 43 of a suction pipe 50 has a flange 51*f* and a tubular shaft 51*j* extending downward from the flange 51*f* as viewed in FIG. 7. The tubular shaft 51*j* is coaxial with the flange 51*f* and is fitted into the through-hole 34*h* of the sender gauge adaptor 34. The flange 51*f* has a contact surface 51*t* for contacting the upper surface of the sender gauge adaptor 34 about the upper opening of the through-hole 34*h*. An annular groove 52 having a rectangular cross section is formed in the outer circumferential surface of the tubular shaft 51*j*. An annular seal member 53 is fitted into the annular groove 52 in order to seal between the tubular shaft 51*j* and the inner circumferential wall of the through-hole 34*h*.

An upper end portion of a short pipe 49*a* is joined to the lower end portion of the pipe body 43 that extends downward from the through-hole 34*h*. The lower end of the short pipe 49*a* is in communication with a suction base (not shown). A suction tube 49*b* is joined to an upper end portion (piping connection portion 43*c*) of the pipe body 43 that extends upward from the through-hole 34*h*.

Figure 8:
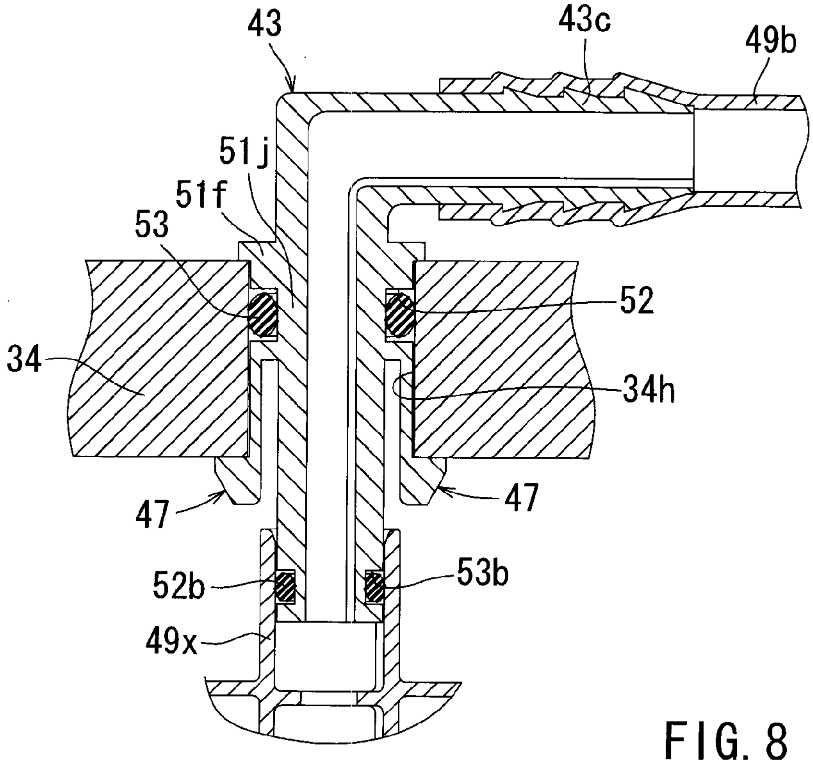
FIG. 8 is a vertical sectional view of a mounting structure for a piping joint according to a further embodiment.
Figure 9:
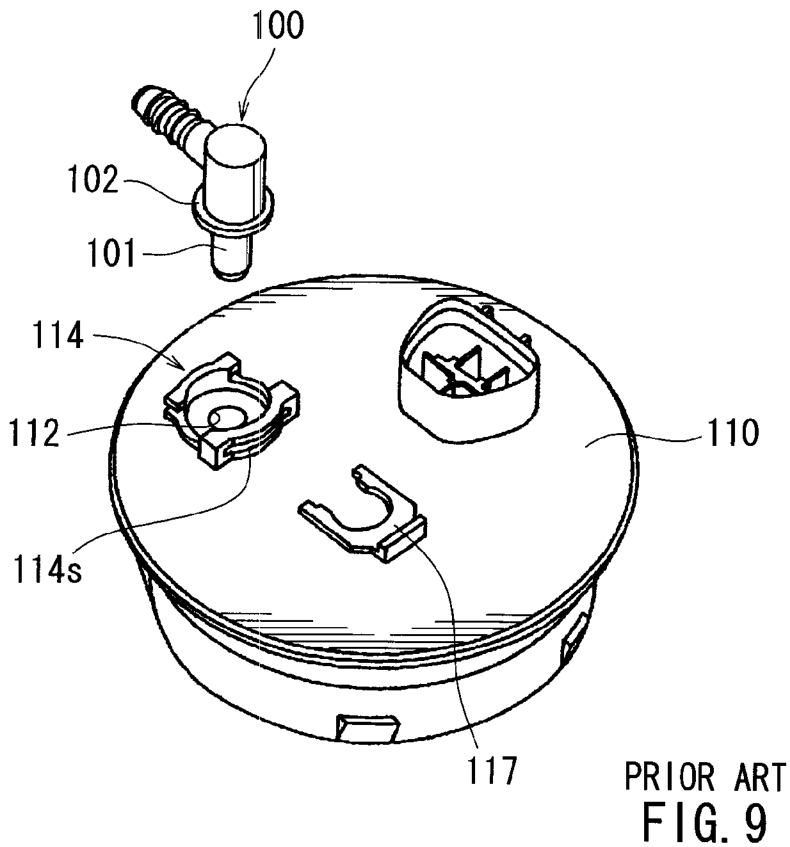
PRIOR ART FIG. 9
FIG. 9 is a perspective view of a mounting structure for a piping joint according to a known art.

Further, although the pipe body 43 is connected to the suction base via the short pipe 49*a* in the arrangement shown in FIG. 7, it is possible to directly connect the lower end of the pipe body 43 to a tubular connecting portion 49*x* of a suction base by fitting the lower end of the pipe body 43 into the connecting portion 49*x* as shown in FIG. 8. In the arrangement shown in FIG. 8, a seal member 53*b* is fitted into an annular groove 52*b* formed in the outer circumferential surface of the lower end of the pipe body 43 in order to seal between the lower end of the pipe body 43 and the inner circumferential wall of the connecting portion 49*x*.

Furthermore, although four hook portions 47 are provided in the above embodiment, three or five or more hook portions 47 may be provided such that they are spaced equally from each other in the circumferential direction.

Furthermore, although the fuel tank 10 is made of resin in the above embodiment, the fuel tank 10 may be made of metal, such as iron.

Furthermore, although the suction pipe 40 (50) is mounted to the sender gauge adaptor 34 in the above embodiment, the present invention can be applied to any other structures in which a pipe or a piping joint is mounted to another element, such as a wall of a container.

This invention claims:

1. A mounting structure for mounting a piping joint to an element with a through-hole formed therein such that the piping joint can rotate about an axis of the through-hole, the piping joint having a connection portion for connecting to a pipe or a tube, the mounting structure comprising:

a flange provided on the piping joint and including a ring-shaped contact surface configured to be able to contact with a first surface of the element about a first end opening of the through-hole; and a plurality of hook portions extending in an axial direction from the flange for inserting into the through-hole; wherein:

the hook portions can resiliently deform radially inward with respect to the axis of the through-hole when hooking ends of the hook portions pass through the through-hole; and the hook portions can return radially outward and the hooking ends can engage a second surface opposite to the first surface of the object opposite about a second end opening opposite to the first end opening of the through-hole after the hooking ends have passed through the through-hole.

2. The mounting structure as in claim 1, wherein:

the piping joint includes a tubular shaft extending from the flange at a position radially inward of the contact surface and configured to be able to be fitted into the through-hole;

base ends opposite to the hook ends of the hook portions are connected to an end portion of the tubular shaft; and a seal member is fitted on an outer circumferential surface of the tubular shaft for sealing between the tubular shaft and an inner circumferential wall of the through-hole.

3. The mounting structure as in claim 1, wherein:

a stopper is formed on the second surface of the element, so that any one of the hooking ends of the hook portions can contact the stopper so as to be prevented from further rotation when the piping joint has rotated to a predetermined position about the axis of the through-hole.

4. The mounting structure as in claim 1, wherein the piping joint comprises a suction pipe defining a part of a flow path of a fuel drawn from within a fuel tank, and the element comprises a part of a sender gauge than can detect an amount of the fuel remaining within the fuel tank.

5. An apparatus comprising:

a fuel tank for storing a fuel therein;

a sender gauge disposed within the fuel tank for detecting an amount of the fuel remaining within the fuel tank, the sender gauge having a plate-like portion;

wherein the plate-like portion has a through-hole formed therein and has a first surface and a second surface opposite to each other with respect to the through-hole;

a suction pipe disposed within the fuel tank for providing a part of a flow path of the fuel drawn from within the fuel tank;

a coupling device constructed to couple the suction pipe to the plate-like portion of the sender gauge;

wherein the coupling device comprises a flange and a plurality of hook portions formed integrally with the suction pipe;

the flange has an axis and defines a contact surface configured to be able to contact with the first surface of the plate-like portion about a first end opening of the through-hole; and the hook portions are arranged in the circumferential direction about the axis of the flange and extend in an axial direction from the flange for inserting into the through-hole;

the hook portions can resiliently deform in a radial direction with respect to the axis of the flange and each has a hooking end that can engage the second surface of the plate-like portion of the sender gauge about a second end opening opposite to the first end opening of the through-hole.

6. The apparatus as in claim 5, further comprising a canister module disposed within the fuel tank for adsorbing a fuel vapor produced within the fuel tank, wherein the sender gauge is mounted to the canister module.

7. The apparatus as in claim 6, wherein:

the canister module is fixedly mounted within the fuel tank; and the sender gauge is vertically movably mounted to the canister module.

8. The apparatus as in claim 7, wherein:

the fuel tank has a top wall and a bottom wall, the top wall has an opening;

the canister module has a closure member that can be attached to top wall of the fuel tank for closing the opening, so that the canister module can be fixed in position relative to the top wall;

the sender gauge is biased vertically downward toward the bottom wall of the fuel tank so as to be held against the bottom wall.

9. The apparatus as in claim 8, wherein the opening of the top wall of the fuel tank is sized to allow insertion of the canister module into the fuel tank together with the sender gauge and the suction pipe.

10. The apparatus as in claim 6, wherein the suction pipe can be rotated relative to the sender gauge to a position where the suction pipe does not interfere with the canister module.

11. The apparatus as in claim 10, further comprising means for limiting the rotation of the suction pipe relative to the sender gauge within a predetermined range.

12. A mounting structure for mounting a suction pipe to an element having a plate-like portion with a through-hole, the suction pipe and the element being adapted to be disposed within a fuel tank, and the suction pipe being configured to provide a part of a flow path of a fuel drawn from within the fuel tank, the mounting structure comprising:

a flange and a plurality of hook portions formed integrally with the suction pipe; wherein:

the flange has an axis and defines a contact surface configured to be able to contact with a first surface of the plate-like portion about a first end opening of the through-hole; and the hook portions are arranged in the circumferential direction about the axis of the flange and extend in an axial direction from the flange for inserting into the through-hole; and the hook portions can resiliently deform in a radial direction with respect to the axis of the flange and each has a hooking end that can engage a second surface opposite to the first surface of the plate-like portion about a second end opening opposite to the first end opening of the through-hole.

13. The mounting structure as in claim 12, wherein the element comprises a part of a sender gauge constructed to be able to detect an amount of the fuel remaining within the fuel tank.

* * * * *